(12) United States Patent
Steinhauser

(10) Patent No.: US 12,371,514 B2
(45) Date of Patent: Jul. 29, 2025

(54) 1-AMINO-3-(OXYALKYLALKOXYSILYL)-2-PROPANOL-TERMINATED DIENE RUBBERS

(71) Applicant: ARLANXEO DEUTSCHLAND GMBH, Dormagen (DE)

(72) Inventor: Norbert Steinhauser, Dormagen (DE)

(73) Assignee: Arlanxeo Deutschland GmbH, Dormagen (DE)

( * ) Notice: Subject to any disclaimer, the term of this patent is extended or adjusted under 35 U.S.C. 154(b) by 637 days.

(21) Appl. No.: 17/628,125

(22) PCT Filed: Jul. 14, 2020

(86) PCT No.: PCT/EP2020/069848
§ 371 (c)(1),
(2) Date: Jan. 18, 2022

(87) PCT Pub. No.: WO2021/009156
PCT Pub. Date: Jan. 21, 2021

(65) Prior Publication Data
US 2022/0275133 A1    Sep. 1, 2022

(30) Foreign Application Priority Data

Jul. 16, 2019 (EP) .................................... 19186580

(51) Int. Cl.
| | |
|---|---|
| *C08C 19/22* | (2006.01) |
| *B60C 1/00* | (2006.01) |
| *B60C 11/00* | (2006.01) |
| *C08C 19/25* | (2006.01) |
| *C08F 8/42* | (2006.01) |
| *C08F 236/10* | (2006.01) |
| *C08F 279/02* | (2006.01) |
| *C08L 9/06* | (2006.01) |

(52) U.S. Cl.
CPC ............ *C08C 19/25* (2013.01); *B60C 1/0016* (2013.01); *B60C 11/0008* (2013.01); *C08C 19/22* (2013.01); *C08F 8/42* (2013.01); *C08F 236/10* (2013.01); *C08F 279/02* (2013.01); *C08L 9/06* (2013.01); *B60C 2011/0025* (2013.01)

(58) Field of Classification Search
CPC . C08C 19/22; C08C 19/25; C08F 8/42; C08F 8/30
See application file for complete search history.

(56) References Cited

U.S. PATENT DOCUMENTS

| | | | |
|---|---|---|---|
| 3,244,664 A | 4/1966 | Zelinski et al. | |
| 4,185,042 A | 1/1980 | Vekouw | |
| 4,616,069 A | 10/1986 | Watanabe et al. | |
| 4,929,679 A | 5/1990 | Akita et al. | |
| 5,332,810 A | 7/1994 | Lawson et al. | |
| 5,362,699 A | 11/1994 | Shepherd et al. | |
| 5,792,820 A | 8/1998 | Lawson et al. | |
| 6,013,718 A | 1/2000 | Cabioch et al. | |
| 6,333,375 B1 | 12/2001 | Nakamura et al. | |
| 9,936,598 B2 | 4/2018 | Gruber | |
| 11,414,509 B2 | 8/2022 | Steinhauser et al. | |
| 2004/0152845 A1 | 8/2004 | Oshima et al. | |
| 2005/0171276 A1 | 8/2005 | Matsuda et al. | |
| 2005/0203251 A1 | 9/2005 | Oshima et al. | |
| 2005/0234193 A1 | 10/2005 | Sasagawa et al. | |
| 2006/0135701 A1 | 6/2006 | Lawson et al. | |
| 2008/0308204 A1 | 12/2008 | Hogan et al. | |
| 2012/0172491 A1 | 7/2012 | Miyazaki | |
| 2014/0011939 A1* | 1/2014 | Iizuka ................... | C08L 21/00 524/493 |
| 2021/0139625 A1 | 5/2021 | Steinhauser et al. | |

FOREIGN PATENT DOCUMENTS

| | | |
|---|---|---|
| CN | 110914313 A | 3/2020 |
| EP | 0 002 864 A1 | 7/1979 |
| EP | 0 180 141 A1 | 5/1986 |
| EP | 0 513 217 B1 | 11/1992 |
| EP | 0 590 490 A1 | 4/1994 |
| EP | 0 594 107 A1 | 4/1994 |
| EP | 0 675 140 A1 | 10/1995 |
| EP | 0 778 311 A1 | 6/1997 |
| EP | 0 864 606 A1 | 9/1998 |
| EP | 3 431 511 A1 | 1/2019 |
| JP | H01-254745 A | 10/1989 |
| JP | 2001-131229 A | 5/2001 |
| JP | 2004-331931 * | 11/2004 |
| JP | 4079942 B2 | 2/2008 |
| JP | 4428555 B2 | 12/2009 |
| JP | 63006034 B2 | 3/2018 |

* cited by examiner

*Primary Examiner* — Marc S Zimmer
(74) *Attorney, Agent, or Firm* — Norris McLaughlin, P.A.

(57) ABSTRACT

The invention concerns 1-amino-3-(oxyalkylalkoxysilyl)-2-propanol-terminated diene rubbers, their preparation and use.

27 Claims, No Drawings

1-AMINO-3-(OXYALKYLALKOXYSILYL)-2-PROPANOL-TERMINATED DIENE RUBBERS

This application is a 371 of International Patent Application No. PCT/EP2020/069848, filed Jul. 14, 2020, which claims priority of European Patent Application No. 19186580.7, filed Jul. 16, 2019, the entire contents of which patent applications are hereby incorporated herein by reference.

The invention pertains to 1-amino-3-(oxyalkylalkoxysilyl)-2-propanol-terminated diene rubbers, their preparation and use.

Important properties of tire treads are good adhesion to dry and wet surfaces, low rolling resistance and high abrasion resistance. It is very difficult to improve the slip resistance of a tire without simultaneously reducing rolling resistance and abrasion resistance. Low rolling resistance is important for low fuel consumption, and high abrasion resistance is the decisive factor for high mileage.

The wet slip resistance and rolling resistance of a tire tread largely depend on the dynamic mechanical properties of the rubbers used in compound manufacture. Rubbers with high rebound elasticity at higher temperatures (60° C. to 100° C.) are used for the tread to reduce rolling resistance. On the other hand, rubbers with a high damping factor at low temperatures (0 to 23° C.) or low rebound elasticity in the range 0° C. to 23° C. are advantageous for improving wet grip. In order to meet this complex requirement profile, compounds of various rubbers are used in the tread. Usually mixtures of one or more rubbers with a relatively high glass transition temperature, such as styrene-butadiene rubber, and one or more rubbers with a relatively low glass transition temperature, such as polybutadiene with a high 1,4-cis content or a styrene-butadiene rubber with a low styrene and vinyl content or a polybutadiene produced in solution with an average 1,4-cis and low vinyl content are used.

Double bond-containing anionically polymerized solution rubbers, such as solution polybutadiene and solution styrene-butadiene rubbers, have advantages over corresponding emulsion rubbers in the production of low rolling resistance tire treads. The advantages include the controllability of the vinyl content and the associated glass transition temperature and molecule branching. In practical application, this results in particular advantages in the relation between wet slip resistance and rolling resistance of the tire. Significant contributions to energy dissipation and thus to rolling resistance in tire treads result from free polymer chain ends and from the reversible build-up and breakdown of the filler network, which is formed by the filler used in the tire tread compound (mostly silica and/or carbon black).

The introduction of functional groups at the polymer chain ends and/or at the polymer chain beginnings enables a physical or chemical bonding of these polymer chain ends or beginnings to the filler surface. This restricts their mobility and thus reduces energy dissipation under dynamic stress on the tread. At the same time, these functional groups can improve the dispersion of the filler in the tire tread, which can lead to a weakening of the filler network and thus to a further reduction in rolling resistance.

To this end, numerous methods for end group modification of diene rubbers have been developed. For example, EP 0 180 141 A1 describes the use of 4,4'-bis(dimethylamino)-benzophenone or N-methylcaprolactam as functionalization reagents. The use of ethylene oxide and N-vinylpyrrolidone is also known from EP 0 864 606 A1. JP 63 006 034 describes end group functionalization using functionalization reagents containing —C(O)N← or —C(S)N← groups such as 1,3-dimethyl-2-imidazolidinone. The disadvantage of these reagents is the low stability of the Mooney viscosity of the functionalized rubber during storage, so that auxiliaries must be added for stabilization.

Methods for the introduction of functional groups at the polymer chain start by means of functional anionic polymerization initiators are described for example in EP 0 513 217 A1 and EP 0 675 140 A1 (initiators with protected hydroxyl group), US 2008/030 8204 A1 (initiators containing thioethers) as well as in U.S. Pat. No. 5,792,820, EP 0 590 490 A1 and EP 0 594 107 A1 (alkali amides of secondary amines as polymerization initiators).

In particular silanes and cyclosiloxanes having in total at least two halogen and/or alkoxy and/or aryloxy substituents on silicon are well suited for the end group functionalization of diene rubbers, since one of the substituents mentioned at the Si atom can be easily replaced by an anionic diene polymer chain end in a rapid substitution reaction and the further substituent(s) mentioned above is/are available as a functional group which can interact, optionally after hydrolysis, with the filler of the tire tread compound. Examples of such silanes can be found in U.S. Pat. Nos. 3,244,664, 4,185,042, EP 0 778 311 A1 and US 2005/0203251 A1.

The functional groups can be bonded directly to the Si atom, or they can be bonded to Si via alkyl groups. The functional groups directly attached to Si are usually alkoxy groups or halogens. Disadvantages of these silanes are the coupling by reaction of several anionic polymer chains per silane molecule, the elimination of interfering components and the coupling by formation of Si—O—Si bonds during processing and storage. EP 3 431 511 A1, for example, describes the use of 3-glycidoxypropyltrialkoxysilanes as suitable reagents for the production of diene rubbers with a high degree of coupling.

It was an object of the invention to provide end group functionalized diene rubbers and a method for the production thereof, which do not have the disadvantages of the state of the art and in particular make it possible to keep the degree of coupling low when using alkoxysilanes as functionalization reagents.

To solve this problem, end group functionalized diene rubbers according to formula (I) are proposed, which have 1-amino-3-(oxyalkyl-alkoxysilyl)-2-propanol groups at the polymer chain ends, which are attached to the polymer chains via alkylamide groups,

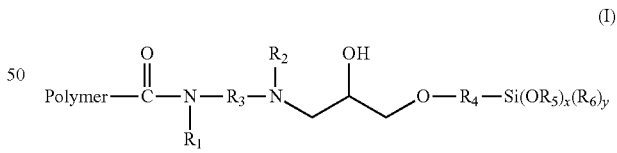

(I)

wherein
$R_1$, $R_2$ are identical or different and represent saturated or unsaturated organic radicals which may contain one or more heteroatoms, preferably independently of one another selected from O, N, S and Si;

$R_3$, $R_4$ are identical or different and represent saturated or unsaturated divalent organic radicals which, in addition to C and H, may contain one or more heteroatoms, preferably independently of one another selected from O, N, S and Si;

$R_5$, $R_6$ are identical or different and represent saturated or unsaturated organic radicals, and $x+y=3$ with $1 \leq x \leq 3$ and $0 \leq y \leq 2$.

In preferred embodiments, $R_1$ and $R_2$, independently from one another, are selected from the group consisting of
- (i) —$C_1$-$C_{24}$-alkyl, saturated or unsaturated, unsubstituted, mono- or polysubstituted;
- (ii) —$C_1$-$C_{24}$-heteroalkyl, saturated or unsaturated, unsubstituted, mono- or polysubstituted;
- (iii) 6-24-membered aryl, unsubstituted, mono- or polysubstituted, wherein said 6-24-membered aryl is optionally connected through —$C_1$-$C_6$-alkylene- or —$C_1$-$C_6$-heteroalkylene-, in each case saturated or unsaturated, unsubstituted, mono- or polysubstituted;
- (iv) 5-24-membered heteroaryl, unsubstituted, mono- or polysubstituted; wherein said 5-24-membered heteroaryl is optionally connected through —$C_1$-$C_6$-alkylene- or —$C_1$-$C_6$-heteroalkylene-, in each case saturated or unsaturated, unsubstituted, mono- or polysubstituted;
- (v) 3-24-membered cycloalkyl, saturated or unsaturated, unsubstituted, mono- or polysubstituted; wherein said 3-24-membered cycloalkyl is optionally connected through —$C_1$-$C_6$-alkylene- or —$C_1$-$C_6$-heteroalkylene-, in each case saturated or unsaturated, unsubstituted, mono- or polysubstituted; and
- (vi) 3-24-membered heterocycloalkyl, saturated or unsaturated, unsubstituted, mono- or polysubstituted; wherein said 3-24-membered heterocycloalkyl is optionally connected through —$C_1$-$C_6$-alkylene- or —$C_1$-$C_6$-heteroalkylene-, in each case saturated or unsaturated, unsubstituted, mono- or polysubstituted; and/or $R_3$ and $R_4$, independently from one another, are selected from the group consisting of
- (i) —$C_1$-$C_6$-alkylene-, saturated or unsaturated, unsubstituted, mono- or polysubstituted;
- (ii) —$C_1$-$C_6$-heteroalkylene-, saturated or unsaturated, unsubstituted, mono- or polysubstituted; and
- (iii) 6-14-membered arylene, unsubstituted, mono- or polysubstituted; and/or $R_5$ and $R_6$, independently from one another, are selected from the group consisting of
- (i) —$C_1$-$C_6$-alkyl, saturated or unsaturated, unsubstituted, mono- or polysubstituted;
- (ii) —$C_1$-$C_6$-heteroalkyl, saturated or unsaturated, unsubstituted, mono- or polysubstituted; and
- (iii) 6-14-membered aryl, unsubstituted, mono- or polysubstituted;

wherein "mono- or polysubstituted" in each case independently means substituted with one or more substituents independently of one another selected from —F, —Cl, —Br, —I, —CN, =O, —$CF_3$, —$CF_2H$, —$CFH_2$, —$CF_2Cl$, —$CFCl_2$, —$C_1$-$C_{18}$-alkyl, saturated or unsaturated, unsubstituted and —$C_1$-$C_{18}$-heteroalkyl, saturated or unsaturated, unsubstituted.

Preferably, "mono- or polysubstituted" in the context of the above preferred embodiments means substituted with one or more substituents independently of one another selected from
- —F, —Cl, —Br, —I, —CN, —$CF_3$, —$CF_2H$, —$CFH_2$, —$CF_2Cl$, —$CFCl_2$,
- —$C_1$-$C_{18}$-alkyl, saturated or unsaturated, unsubstituted, and
- —$C_1$-$C_{18}$-heteroalkyl, saturated or unsaturated, unsubstituted.

In yet another preferred embodiment, "mono- or polysubstituted" means substituted with one or more substituents independently of one another selected from
- —$C_1$-$C_{18}$-alkyl, saturated, unsubstituted, and
- —$C_1$-$C_6$-alkyl-Si(O—$C_1$-$C_6$-alkyl)$_3$, wherein in each case —$C_1$-$C_6$-alkyl is saturated, unsubstituted.

In a particularly preferred embodiment, $R_1$ is (i) —$C_1$-$C_6$-alkyl, saturated or unsaturated, unsubstituted; preferably (ii) —$C_1$-$C_2$-alkyl, saturated or unsaturated, unsubstituted; and/or $R_2$ is (i) —$C_1$-$C_6$-alkyl, saturated or unsaturated, unsubstituted; preferably (ii) —$C_1$-$C_2$-alkyl, saturated or unsaturated, unsubstituted; and/or $R_3$ is (i) —$C_1$-$C_6$-alkylene-, saturated or unsaturated, unsubstituted; preferably (ii) —$C_1$-$C_3$-alkylene-, saturated or unsaturated, unsubstituted; and/or $R_4$ is —$C_1$-$C_6$-alkylene-, saturated or unsaturated, unsubstituted; and/or either (i) $R_5$ is —$C_1$-$C_6$-alkyl, saturated or unsaturated, unsubstituted and $R_6$ is —$C_1$-$C_6$-alkyl, saturated or unsaturated, unsubstituted; preferably (ii) $R_5$ is —$C_1$-$C_6$-alkyl, saturated or unsaturated, unsubstituted, x is 3 and y is 0.

In a particularly preferred embodiment of the 1-amino-3-(oxyalkyl-alkoxysilyl)-2-propanol-terminated polymer according to the invention, $R_1$ is —$C_1$-$C_2$-alkyl, saturated or unsaturated, unsubstituted; and/or $R_2$ is —$C_1$-$C_2$-alkyl, saturated or unsaturated, unsubstituted; and/or $R_3$ is —$C_1$-$C_2$-alkylene-, saturated or unsaturated, unsubstituted; and/or $R_4$ is —$C_1$-$C_6$-alkylene-, saturated or unsaturated, unsubstituted; and/or either (i) $R_5$ is —$C_1$-$C_6$-alkyl, saturated or unsaturated, unsubstituted and $R_6$ is —$C_1$-$C_6$-alkyl, saturated or unsaturated, unsubstituted; preferably (ii) $R_5$ is —$C_1$-$C_6$-alkyl, saturated or unsaturated, unsubstituted, x is 3 and y is 0.

The following definitions apply:

The term "polymer" as used herein corresponds to the same-named residue contained in the compounds according to formula (I).

The term "alkyl, saturated or unsaturated" as used herein encompasses saturated alkyl as well as unsaturated alkyl such as alkenyl, alkynyl, and the like. The term "alkyl" as used herein means normal, secondary, or tertiary, linear or branched hydrocarbon with no site of unsaturation. Examples are methyl, ethyl, 1-propyl (n-propyl), 2-propyl (iPr), 1-butyl, 2-methyl-1-propyl(i-Bu), 2-butyl (s-Bu), 2-dimethyl-2-propyl (t-Bu), 1-pentyl (n-pentyl), 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, and 3,3-dimethyl-2-butyl. The term "alkenyl" as used herein means normal, secondary or tertiary, linear or branched hydrocarbon with at least one site (usually 1 to 3, preferably 1) of unsaturation, namely a carbon-carbon, sp2 double bond. Examples include, but are not limited to: ethylene or vinyl (—CH=$CH_2$), allyl (—$CH_2$CH=$CH_2$), and 5-hexenyl (—$CH_2CH_2CH_2CH_2$CH=$CH_2$). The double bond may be in the cis or trans configuration. The term "alkynyl" as used herein means normal, secondary, tertiary, linear or branched hydrocarbon with at least one site (usually 1 to 3, preferably 1) of unsaturation, namely a carbon-carbon, sp triple bond. Examples include, but are not limited to: ethynyl (—C CH), and 1-propynyl (propargyl, —CH₂C CH).

The term "alkylene, saturated or unsaturated" as used herein encompasses saturated alkylene as well as unsaturated alkylene such as alkenylene, alkynylene, alkenynylene and the like. The term "alkylene" as used herein means saturated, linear or branched chain hydrocarbon radical having two monovalent radical centers derived by the removal of two hydrogen atoms from the same or two different carbon atoms of a parent alkane. Typical alkylene radicals include, but are not limited to: methylene (—CH₂—), 1,2-ethyl (—CH₂CH₂—), 1,3-propyl (—CH₂CH₂CH₂—), 1,4-butyl (—CH₂CH₂CH₂CH₂—), and the like. The term "alkenylene" as used herein means linear or branched chain hydrocarbon radical with at least one site (usually 1 to 3, preferably 1) of unsaturation, namely a carbon-carbon, sp2 double bond, and having two monovalent radical centers derived by the removal of two hydrogen atoms from the same or two different carbon atoms of a parent alkene. The term "alkynylene" as used herein means linear or branched chain hydrocarbon radical with at least one site (usually 1 to 3, preferably 1) of unsaturation, namely a carbon-carbon, sp triple bond, and having two monovalent radical centers derived by the removal of two hydrogen atoms from the same or two different carbon atoms of a parent alkyne.

The term "heteroalkyl, saturated or unsaturated" as used herein encompasses saturated heteroalkyl as well as unsaturated heteroalkyl such as heteroalkenyl, heteroalkynyl, heteroalkenynyl and the like. The term "heteroalkyl" as used herein means linear or branched chain alkyl wherein one or more carbon atoms (usually 1, 2 or 3) are replaced by a heteroatom, i.e. an oxygen, nitrogen, sulfur or silicium atom, with the proviso that said chain may not contain two adjacent O atoms or two adjacent S atoms. This means that one or more —CH₃ of said alkyl can be replaced by —NH₂ and/or that one or more —CH₂— of said alkyl can be replaced by —NH—, —O—, —S— or —Si—. The S atoms in said chains may be optionally oxidized with one or two oxygen atoms, to afford sulfoxides and sulfones, respectively. Furthermore, the heteroalkyl groups in the benzofurane derivatives of the invention can contain an oxo or thio group at any carbon or heteroatom that will result in a stable compound. Exemplary heteroalkyl groups include, but are not limited to, alcohols, alkyl ethers (such as for example -methoxy, -ethoxy, -butoxy, . . . ), primary, secondary, and tertiary alkyl amines, amides, ketones, esters, alkyl sulfides, and alkyl sulfones. The term "heteroalkenyl" means linear or branched chain alkenyl wherein one or more carbon atoms (usually 1, 2 or 3) are replaced by an oxygen, nitrogen or sulfur atom, with the proviso that said chain may not contain two adjacent O atoms or two adjacent S atoms. The term heteroalkenyl thus comprises imines, —O-alkenyl, —NH-alkenyl, —N(alkenyl)₂, —N(alkyl)(alkenyl), and —S-alkenyl. The term "heteroalkynyl" as used herein means linear or branched chain alkynyl wherein one or more carbon atoms (usually 1, 2 or 3) are replaced by an oxygen, nitrogen or sulfur atom, with the proviso that said chain may not contain two adjacent O atoms or two adjacent S atoms. The term heteroalkynyl thus comprises -cyano, —O-alkynyl, —NH-alkynyl, —N(alkynyl)₂, —N(alkyl)(alkynyl), —N(alkenyl)(alkynyl), and —S-alkynyl.

The term "heteroalkylene, saturated or unsaturated" as used herein encompasses saturated heteroalkylene as well as unsaturated heteroalkylene such as heteroalkenylene, heteroalkynylene, heteroalkenynylene and the like. The term "heteroalkylene" as used herein means linear or branched chain alkylene wherein one or more carbon atoms (usually 1, 2 or 3) are replaced by a heteroatom, i.e. an oxygen, nitrogen or sulfur atom, with the proviso that said chain may not contain two adjacent O atoms or two adjacent S atoms. The term "heteroalkenylene" as used herein means linear or branched chain alkenylene wherein one or more carbon atoms (usually 1, 2 or 3) are replaced by an oxygen, nitrogen or sulfur atom, with the proviso that said chain may not contain two adjacent O atoms or two adjacent S atoms. The term "heteroalkynylene" as used herein means linear or branched chain alkynylene wherein one or more carbon atoms (usually 1, 2 or 3) are replaced by an oxygen, nitrogen or sulfur atom, with the proviso that said chain may not contain two adjacent O atoms or two adjacent S atoms.

The term "cycloalkyl, saturated or unsaturated" as used herein encompasses saturated cycloalkyl as well as unsaturated cycloalkyl such as cycloalkenyl, cycloalkynyl and the like. The term "cycloalkyl" as used herein and unless otherwise stated means a saturated cyclic hydrocarbon radical, such as for instance cyclopropyl, cyclobutyl, cyclopentyl, cyclohexyl, cycloheptyl, cyclooctyl, norbornyl, fenchyl, decalinyl, adamantyl and the like. The term "cycloalkenyl" as used herein means a non-aromatic cyclic hydrocarbon radical with at least one site (usually 1 to 3, preferably 1) of unsaturation, namely a carbon-carbon, sp2 double bond. Examples include, but are not limited to cyclopentenyl and cyclohexenyl. The double bond may be in the cis or trans configuration. The term "cycloalkynyl" as used herein means a non-aromatic cyclic hydrocarbon radical with at least one site (usually 1 to 3, preferably 1) of unsaturation, namely a carbon-carbon, sp triple. An example is cyclohept-1-yne. Fused systems of a cycloalkyl ring with a heterocycloalkyl ring are considered as heterocycloalkyl irrespective of the ring that is bound to the core structure. Fused systems of a cycloalkyl ring with an aryl ring are considered as aryl irrespective of the ring that is bound to the core structure. Fused systems of a cycloalkyl ring with a heteroaryl ring are considered as heteroaryl irrespective of the ring that is bound to the core structure.

The term "heterocycloalkyl, saturated or unsaturated" as used herein encompasses saturated heterocycloalkyl as well as unsaturated non-aromatic heterocycloalkyl including at least one heteroatom, i.e. an N, O, or S as ring member. The term "heterocycloalkyl" as used herein and unless otherwise stated means "cycloalkyl" wherein one or more carbon atoms (usually 1, 2 or 3) are replaced by an oxygen, nitrogen or sulfur atom, with the proviso that said chain may not contain two adjacent O atoms or two adjacent S atoms. The term "heterocycloalkenyl" as used herein and unless otherwise stated means "cycloalkenyl" wherein one or more carbon atoms (usually 1, 2 or 3) are replaced by an oxygen, nitrogen or sulfur atom, with the proviso that said chain may not contain two adjacent O atoms or two adjacent S atoms. The term "heterocycloalkynyl" as used herein and unless otherwise stated means "cycloalkynyl" wherein one or more carbon atoms (usually 1, 2 or 3) are replaced by an oxygen, nitrogen or sulfur atom, with the proviso that said chain may not contain two adjacent O atoms or two adjacent S atoms. Examples of saturated and unsaturated heterocycloalkyl include but are not limited to azepane, 1,4-oxazepane, azetane, azetidine, aziridine, azocane, diazepane, dioxane, dioxolane, dithiane, dithiolane, imidazolidine, isothiazolidine, isoxalidine, morpholine, oxazolidine, oxepane, oxetane, oxirane, piperazine, piperidine, pyrazolidine, pyrrolidine, quinuclidine, tetrahydrofurane, tetrahydropyrane, tetrahydrothiopyrane, thiazolidine, thietane, thiirane, thiolane, thiomorpholine, indoline, dihydrobenzofurane, dihydrobenzothiophene, 1,1-dioxothiacyclohexane, 2-azaspiro[3.3]-heptane, 2-oxaspiro[3.3]heptane, 7-azaspiro[3.5]nonane, 8-azabicyclo[3.2.1]octane, 9-azabicyclo[3.3.1]nonane, hexahydro-1H-pyrrolizine, hexahydrocyclopenta[c]pyrrole, octahydrocyclopenta[c]pyrrole, and octahydropyrrolo[1,2-a]pyrazin. Further heterocycloalkyls in the meaning of the invention are described in Paquette, Leo A. "Principles of Modern Heterocyclic Chemistry" (W. A. Benjamin, New York, 1968), particularly Chapters 1, 3, 4, 6, 7, and 9; "The Chemistry of Heterocyclic Compounds, A series of Monographs" (John Wiley & Sons, New York, 1950 to present), in particular Volumes 13, 14, 16, 19, and 28; Katritzky, Alan R., Rees, C. W. and Scriven, E. "Comprehensive Heterocyclic Chemistry" (Pergamon Press, 1996); and J. Am. Chem. Soc. (1960) 82:5566. When the heterocycloalkyl contains no nitrogen as ring member, it is typically bonded through carbon. When the heterocycloalkyl contains nitrogen as ring member, it may be bonded through nitrogen or carbon. Fused systems of heterocycloalkyl ring with a cycloalkyl ring are considered as heterocycloalkyl irrespective of the ring that is bound to the core structure. Fused systems of a heterocycloalkyl ring with an aryl ring are considered as heterocycloalkyl irrespective of the ring that is bound to the core structure. Fused systems of a heterocycloalkyl ring with a heteroaryl ring are considered as heteroaryl irrespective of the ring that is bound to the core structure.

The term "aryl" as used herein means an aromatic hydrocarbon. Typical aryl groups include, but are not limited to 1 ring, or 2 or 3 rings fused together, radicals derived from benzene, naphthalene, anthracene, biphenyl, and the like. Fused systems of an aryl ring with a cycloalkyl ring are considered as aryl irrespective of the ring that is bound to the core structure. Fused systems of an aryl ring with a heterocycloalkyl ring are considered as heterocycloalkyl irrespective of the ring that is bound to the core structure. Thus, indoline, dihydrobenzofurane, dihydrobenzothiophene and the like are considered as heterocycloalkyl according to the invention. Fused systems of an aryl ring with a heteroaryl ring are considered as heteroaryl irrespective of the ring that is bound to the core structure.

The term "arylene" as used herein means bivalent groups derived from arenes by removal of a hydrogen atom from two ring carbon atoms. A synonym is arenediyl groups. Examples of arylene include but are not limited to phenylene and benzene-1,2-diyl.

The term "heteroaryl" as used herein means an aromatic ring system including at least one heteroatom, i.e. N, O, or S as ring member of the aromatic ring system. Examples of heteroaryl include but are not limited to benzimidazole, benzisoxazole, benzoazole, benzodioxole, benzofurane, benzothiadiazole, benzothiazole, benzothiophene, carbazole, cinnoline, dibenzofurane, furane, furazane, imidazole, imidazopyridine, indazole, indole, indolizine, isobenzofurane, isoindole, isoquinoline, isothiazole, isoxazole, naphthyridine, oxadiazole, oxazole, oxindole, phthalazine, purine, pyrazine, pyrazole, pyridazine, pyridine, pyrimidine, pyrrole, quinazoline, quinoline, quinoxaline, tetrazole, thiadiazole, thiazole, thiophene, triazine, triazole, and [1,2,4]triazolo[4,3-a]pyrimidine.

The term "heteroarylene" as used herein means bivalent groups derived from heteroarenes by removal of a hydrogen atom from two ring carbon atoms.

The end group functionalized diene rubbers according to the invention are prepared or obtainable by homo- or copolymerization of conjugated dienes and copolymerization of conjugated dienes with vinyl aromatic monomers and subsequent reaction with suitable functionalization reagents.

The preferred conjugated dienes are 1,3-butadiene, isoprene, 1,3-pentadiene, 2,3-dimethylbutadiene, 1-phenyl-1,3-butadiene, 1,3-hexadiene, myrcene, ocimenes and/or farnesenes. 1,3-Butadiene and/or isoprene are particularly preferred.

For example, styrene, o-, m- and/or p-methylstyrene, p-tert-butylstyrene, -methylstyrene, vinylnaphthalene, divinylbenzene, trivinylbenzene and/or divinylnaphthalene can be used as vinylaromatic comonomers. Styrene is particularly preferred.

In a particularly preferred embodiment, the 1-amino-3-(oxyalkyl-alkoxysilyl)-2-propanol-terminated polymer according to the invention comprises a "polymer" that is obtainable by copolymerization of 1,3-butadiene with styrene.

These polymers are preferably prepared or obtainable by anionic solution polymerization or by polymerization using coordination catalysts. Coordination catalysts in this context are Ziegler-Natta catalysts or monometallic catalyst systems. Preferred coordination catalysts are those based on Ni, Co, Ti, Zr, Nd, V, Cr, Mo, W or Fe.

Initiators for anionic solution polymerization are those based on alkali or alkaline earth metals, e.g. methyl lithium, ethyl lithium, isopropyllithium, n-butyllithium, sec-butyllithium, pentyllithium, n-hexyllithium, cyclohexyllithium, octyllithium, decyl-lithium, 2-(6-lithio-n-hexoxy)tetrahydropyran, 3-(tert-butyldimethylsiloxy)-1-propyllithium, phenyllithium, 4-butyl-phenyllithium, 1-naphthyllithium, p-toluyllithium and allyllithium compounds, derived from tertiary N-allylamines such as [1-(dimethylamino)-2-propenyl]lithium, [1-[bis(phenylmethyl)-amino]-2-propenyl]lithium, [1-(diphenylamino)-2-propenyl]lithium, [1-(1-pyrrolidinyl)-2-pro-penyl]lithium, Lithium amides of secondary amines such as lithium pyrrolidide, lithium piperidide, lithium hexamethylene imide, lithium 1 methyl imidazolidide, lithium 1-methyl piperazide, lithium morpholide, lithium dicyclohexylamide, lithium dibenzyl amide, lithium diphenyl amide. These allyllithium compounds and these lithium amides can also be prepared in situ by reacting an organolithium compound with the respective tertiary N-allylamines or with the respective secondary amines. Di- and polyfunctional organolithium compounds can also be used, for example 1,4-dilithiobutane, dilithium piperazide. Preferably n-butyllithium and sec-butyllithium are used.

In addition, the well-known randomizers and control agents can be used for the microstructure of the polymer, for example diethyl ether, di-n-propylether, diisopropyl ether, di-n-butylether, ethylene glycol dimethyl ether, Ethylene glycol diethyl ether, ethylene glycol di-n-butyl ether, ethylene glycol di-tert-butyl ether, diethylene glycol dimethyl ether, diethylene glycol diethyl ether, diethylene glycol di-n-butyl ether, diethylene glycol di-tertbutyl ether, 2-(2-ethoxyethoxy)-2-methylpropane, triethylene glycol dimethyl ether, tetrahydrofuran, ethyltetrahydrofurfuryl ether, hexyltetrahydrofurfuryl ether, 2,2-bis(2-tetrahydrofuryl)propane, dioxane, trimethylamine, triethylamine, N,N,N',N'-tetramethyl-ethylenediamine, N-methylmorpholine, N-ethylmorpholine, 1,2-dipiperi-dinoethane, 1,2-dipyrrolidinoethane, 1,2-dimorpholinoethane and potassium and sodium salts of alcohols, phenols, carboxylic acids, sulphonic acids.

Such solution polymerizations are known and described, for example, in I. Franta, Elastomers and Rubber Compounding Materials; Elsevier 1989, pages 113-131, in Houben-Weyl, Methoden der Organischen Chemie, Thieme Verlag, Stuttgart, 1961, volume XIV/1 pages 645 to 673 or in volume E 20 (1987), pages 114 to 134 and pages 134 to 153 as well as in Comprehensive Polymer Science, Vol. 4, Part II (Pergamon Press Ltd., Oxford 1989), pages 53-108.

The production of the preferred diene homo- and diene copolymers preferably takes place in a solvent. The preferred solvents for polymerization are inert aprotic solvents such as aliphatic hydrocarbons such as isomeric butanes, pentanes, hexanes, heptanes, octanes, decanes, cyclopentane, methylcyclopentane, cyclohexane, methylcyclohexane, ethylcyclohexane or 1,4-dimethylcyclohexane or alkenes such as 1-butene or aromatic hydrocarbons such as benzene, toluene, ethylbenzene, xylene, diethylbenzene or propylbenzene. These solvents can be used individually or in combination. Preferred solvents are cyclohexane, methylcyclopentane and n hexane. Mixing with polar solvents is also possible.

The amount of solvent in the invention process is usually in the range from 100 to 1000 g, preferably in the range from 200 to 700 g, based on 100 g of the total amount of monomer used. However, it is also possible to polymerize the monomers used in the absence of solvents.

Polymerization can be carried out by first introducing the monomers and the solvent and then starting the polymerization by adding the initiator or catalyst. It is also possible to polymerize in a feed process where the polymerization reactor is filled by adding monomers and solvents, the initiator or catalyst being introduced or added with the monomers and solvent.

Variations are possible, such as the introduction of the solvent in the reactor, the addition of the initiator or catalyst and then the addition of the monomers. Furthermore, polymerization can be carried out in a continuous mode. Further monomer and solvent addition during or at the end of polymerization is possible in all cases.

The polymerization time can vary from a few minutes to several hours. Polymerization is usually carried out within a period of 10 minutes to 8 hours, preferably 20 minutes to 4 hours. It can be carried out both at normal pressure and at elevated pressure (from 1 to 10 bar).

It was surprisingly found that by successively adding 1) one or more cyclic urea derivatives and 2) one or more glycidoxyalkylsilanes as functionalization reagents, 1-amino-3-(oxyalkylalkoxysilyl)-2-propanol-terminated polymers can be prepared which do not have the disadvantages of the state of the art.

The cyclic urea derivatives are compounds of the formula (II)

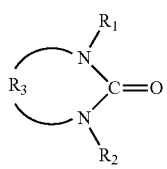

(II)

where
$R_1$, $R_2$ are identical or different and represent saturated or unsaturated organic radicals which may contain one or more heteroatoms, preferably independently of one another selected from O, N, S and Si;
$R_3$ is a saturated or unsaturated divalent organic radical which, in addition to C and H, may contain one or more heteroatoms, preferably independently of one another selected from O, N, S and Si;

where preferably,
$R_1$, $R_2$ are identical or different and are —($C_1$-$C_{24}$)-alkyl, —($C_3$-$C_{24}$)-cycloalkyl, —($C_6$-$C_{24}$)-aryl, —($C_6$-$C_{24}$)-alkaryl or —($C_6$-$C_{24}$)-aralkyl radicals which may contain one or more heteroatoms, preferably independently of one another selected from O, N, S and Si; and
$R_3$ is a —$C_2H_4$—, —$C_3H_6$— or —$C_4H_8$-alkylene- radical.

Preferably, $R_1$ and $R_2$ are both —$CH_3$ and/or $R_3$ is —$CH_2$—$CH_2$—.

Preferred examples of compounds of formula (II) include but are not limited to:

1,3-Dimethyl-2-imidazolidinone (1), 1,3-diethyl-2-imidazolidinone (2), 1-methyl-3-phenyl-2-imidazolidinone (3), 1,3-diphenyl-2-imidazolidinone (4), 1,3-dimethyl-2-imidazolidinone (1), 1,3-dimethyl-2-imidazolidinone (2), 1,3-dimethyl-2-imidazolidinone (3), 1,3-dimethyl-2-imidazolidinone (3), 1,3-dimethyl-2-imidazolidinone (3), 1,3-dimethyl-2-imidazolidinone (3), 1,3-dimethyl-2-imidazolidinone (4), 1,3-dimethyl-2-imidazolidinone (3), 3-diethenyl-2-imidazolidinone (5), 1,3,4-trimethyl-2-imidazolidinone (6), 1,3-bis(trimethylsilyl)-2-imidazolidinone (7), 1,3-dihydro-1,3-dimethyl-2H-imidazol-2-one (8), tetrahydro-1,3-dimethyl-2(1H)-pyrimidinone (9), tetrahydro-1-methyl-3-phenyl-2(1H)-pyrimidinone (10), tetrahydro-1,3,5-trimethyl-2(1H)-pyrimidinone (11), tetrahydro-3,5-dimethyl-4H-1,3,5-oxadiazin-4-one (12), tetrahydro-1,3,5-trimethyl-1,3,5-triazin-2(1H)-one (13), hexahydro-1,3-dimethyl-2H-1,3-diazepin-2-one (14):

(1)

(2)

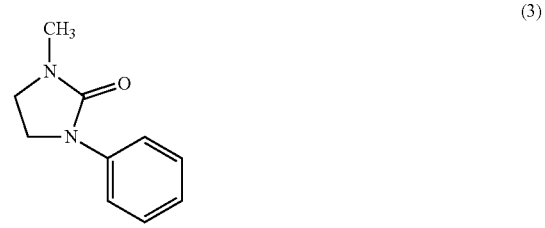

(3)

(4) 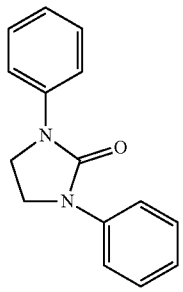

(5) 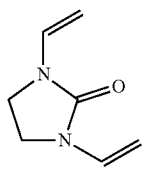

(6) 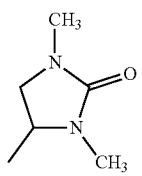

(7) 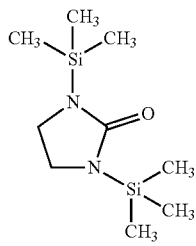

(8) 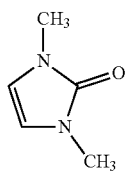

(9) 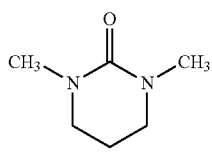

(10) 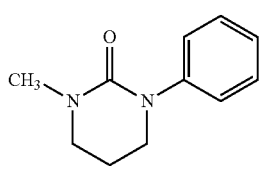

(11) 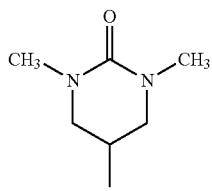

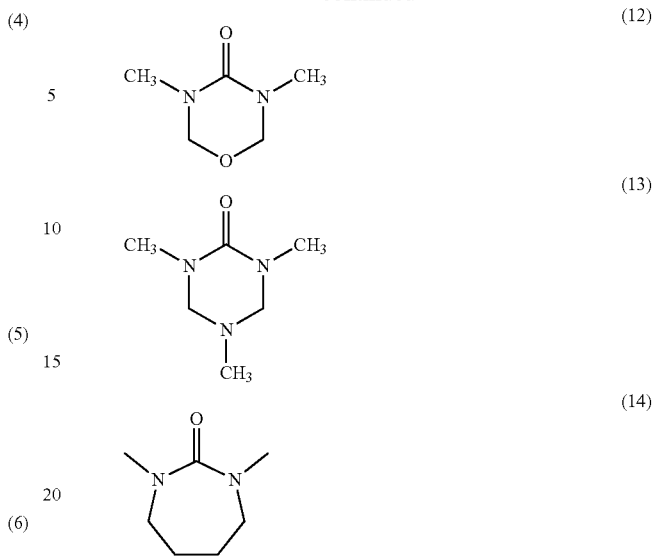

(12)

(13)

(14)

A particularly preferred example of compounds of formula (II) is 1,3-Dimethyl-2-imidazolidinone (1):

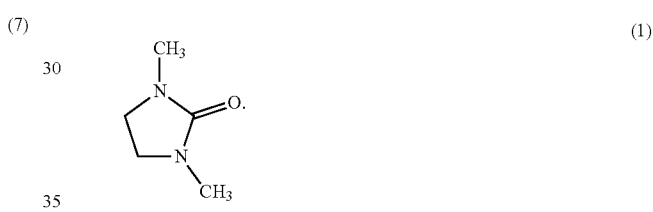

(1)

The glycidoxyalkylsilanes are compounds of the formula (III)

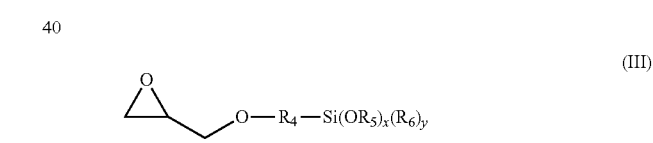

(III)

where
- $R_4$ is a saturated or unsaturated divalent organic radical which, in addition to C and H, may contain one or more heteroatoms, preferably independently of one another selected from O, N, S and Si;
- $R_5$, $R_6$ are identical or different and represent saturated or unsaturated organic radicals; and
- $x+y=3$ with $1 \leq x \leq 3$ and $0 \leq y \leq 2$;

where preferably,
- $R_4$ is a —CH$_2$—, —C$_2$H$_4$—, —C$_3$H$_6$— or —C$_4$H$_8$-alkylene- radical; and
- $R_5$ and $R_6$ are methyl, ethyl, propyl or phenyl radicals.

Preferably, $R_4$ is —(CH$_2$)$_{2-4}$—, y is 0, x is 3, $R_5$ is —C$_1$-C$_4$-alkyl.

Preferably, $R_4$ is —CH$_2$CH$_2$CH$_2$—, y is 0, x is 3, $R_5$ is —CH$_3$ or —CH$_2$CH$_3$.

Preferred examples of compounds of formula (III) include but are not limited to:
(3-glycidoxypropyl)trimethoxysilane (15), (3-glycidyloxypropyl)triethoxysilane (16), (3-glycidyloxypropyl)tripropoxysilane (17), (3-glycidyloxypropyl)triphenoxysilane (18), (3-glycidoxypropyl)methyldimethoxysilane (19), (3-glycidyloxypropyl)dimethylmethoxysilane (20), (2-glycidoxyethyl)trimethoxysilane (21), glycidoxymethyltrimethoxysilane (22), (4-glycidoxybutyl)trimethoxysilane (23), (6-glycidyloxyhexyl)trimethoxysilane (24), [2-(glycidoxy)propyl]trimethoxysilane (25), 2-[[4-[(trimethoxysilyl)methyl]phenoxy]methyl]oxiran (26):

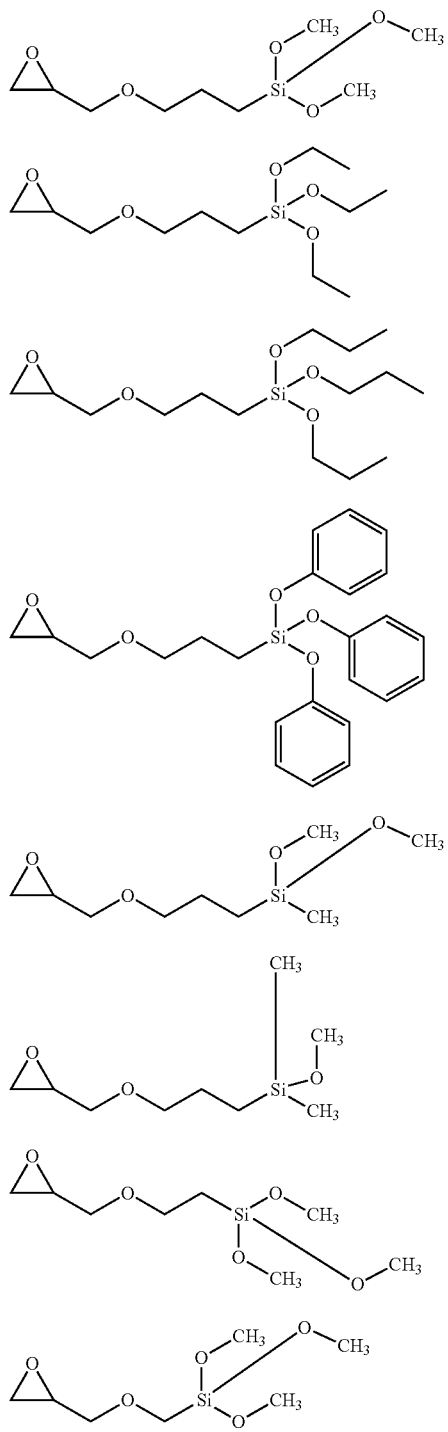

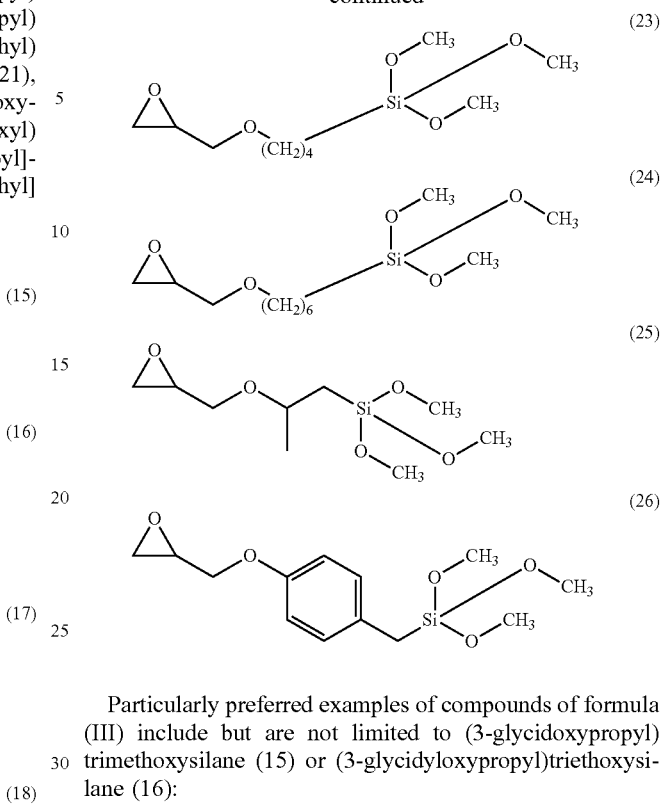

Particularly preferred examples of compounds of formula (III) include but are not limited to (3-glycidoxypropyl)trimethoxysilane (15) or (3-glycidyloxypropyl)triethoxysilane (16):

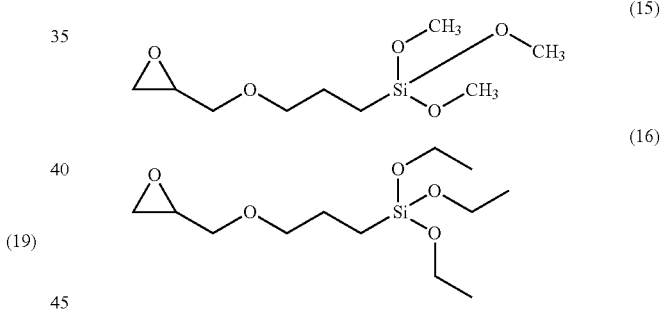

It was found that the end group functionalized diene rubbers according to the invention can be prepared by successive reaction of reactive polymer chain ends from anionic diene polymerization with first a cyclic urea derivative and then with a glycidoxyalkylsilane.

In a particularly preferred embodiment of the 1-amino-3-(oxyalkyl-alkoxysilyl)-2-propanol-terminated polymer according to the invention,
 the "polymer" is obtainable by copolymerization of 1,3-butadiene with styrene;
 $R_1$ is —$C_1$-$C_2$-alkyl, saturated or unsaturated, unsubstituted;
 $R_2$ is —$C_1$-$C_2$-alkyl, saturated or unsaturated, unsubstituted;
 $R_3$ is —$C_1$-$C_3$-alkylene-, saturated or unsaturated, unsubstituted;
 $R_4$ is —$C_3$-alkylene-, saturated or unsaturated, unsubstituted;
 $R_5$ and $R_6$ independently of one another are —$C_1$-$C_2$-alkyl, saturated or unsaturated, unsubstituted;
 $x+y=3$ with $1 \leq x \leq 3$ and $0 \leq y \leq 2$; preferably $x=3$ and $y=0$.

In a particularly preferred embodiment of the 1-amino-3-(oxyalkyl-alkoxysilyl)-2-propanol-terminated polymer according to the invention,
the "polymer" is obtainable by copolymerization of 1,3-butadiene with styrene;
$R_1$ is —$CH_3$;
$R_2$ is —$CH_3$;
$R_3$ is —$CH_2CH_2$—; and
$R_4$ is —$CH_2CH_2CH_2$—;
x=3 and y=0;
$R_5$ is —$CH_3$ or —$CH_2CH_3$.

Another aspect of the invention relates to the successive use of first a cyclic urea derivative and then a glycidoxyalkylsilane as functionalization reagents for the preparation of the invention end group functionalized diene rubbers with end groups of formulae (I) as described herein.

The end group functionalized polymers according to the invention preferably have average molecular weights (number average, Mn) of 10,000 to 2,000,000 g/mol, preferably of 100,000 to 1,000,000 g/mol and glass transition temperatures of –110° C. to +20° C., preferably of –110° C. to 0° C., and Mooney viscosities [ML 1+4 (100° C.)] of 10 to 200, preferably of 30 to 150 Mooney units.

Another aspect of the invention relates to a process for the preparation of the inventive end group functionalized polymers, according to which one or more compounds of the formula (II), as pure substance, solution or suspension, are first added to polymers with reactive polymer chain ends. Addition shall preferably take place after completion of polymerization, but may also take place before complete monomer conversion. The reaction of compounds of formula (II) with polymers having reactive polymer chain ends takes place at the temperatures normally used for polymerization. The reaction times for the reaction of compounds of the formula (II) with the reactive polymer chain ends can range from a few minutes to several hours.

The amount of these compounds can be selected so that all reactive polymer chain ends react with compounds of the formula (II), or an undersupply of these compounds can be used. The amounts of compounds of formula (II) used can cover a wide range. The preferred amounts are in the range from 0.3 to 2 molar equivalents, particularly preferred in the range from 0.6 to 1.5 molar equivalents, based on the amount of initiator or catalyst used for polymerization.

In the subsequent step, compounds of the formula (III) are then added as pure material, solution or suspension to the polymers obtained from the preceding step by adding compounds of the formula (II). The reaction of compounds of formula (III) takes place at the temperatures normally used for polymerization. The reaction times for the reaction of compounds of the formula (III) can range from a few minutes to several hours.

The quantities of compounds of formula (III) used may cover a wide range. The preferred amounts are in the range from 0.3 to 2 molar equivalents, particularly preferably in the range from 0.6 to 1.5 molar equivalents, based on the amount of compounds of the formula (II) used.

In addition to compounds of the formula (II) and the formula (111), the coupling reagents typical for anionic diene polymerization can also be used for reaction with the reactive polymer chain ends. Examples of such coupling reagents are silicon tetrachloride, methyltrichlorosilane, dimethyldichlorosilane, tin tetrachloride, dibutyltin dichloride, tetraalkoxysilanes, ethylene glycol diglycidyl ether, 1,2,4-tris(chloromethyl)benzene. Such coupling reagents may be added before, together with or after the compounds of formula (II).

After addition of compounds of the formula (II) and formula (III) and optionally coupling reagents, the usual antioxidants, such as sterically hindered phenols, aromatic amines, phosphites, thioethers, are preferably added before or during the working up of the 1-amino-3-(oxyalkylalkoxysilyl)-2-propanol-terminated polymers according to the invention.

Furthermore, the usual extender oils used for diene rubbers such as TDAE (Treated Distillate Aromatic Extract)-, MES (Mild Extraction Solvates)-, RAE (Residual Aromatic Extract)-, TRAE (Treated Residual Aromatic Extract)-, naphthenic and heavy naphthenic oils can be added. It is also possible to add fillers such as carbon black and silica, rubbers and rubber additives.

The solvent can be removed from the polymerization process by the usual methods, such as distillation, stripping with steam or applying a vacuum, if necessary at higher temperatures.

A further aspect of invention is the use of the end group functionalized polymers according to the invention for the production of vulcanizable rubber compositions.

Preferably, these vulcanizable rubber compositions contain further rubbers, fillers, rubber chemicals, processing aids and extender oils.

Additional rubbers are, for example, natural rubber and synthetic rubber. If present, their quantity is usually in the range from 0.5 to 95% by weight, preferably in the range from 10 to 80% by weight, based on the total polymer quantity in the mixture. The amount of additional rubber added again depends on the intended use of the invention. Examples of such synthetic rubbers are BR (polybutadiene), acrylic acid alkyl ester copolymers, IR (polyisoprene), E-SBR (styrene-butadiene copolymers produced by emulsion polymerization), S-SBR (styrene-butadiene copolymers produced by solution polymerization), IIR (isobutylene-isoprene copolymers), NBR (butadiene-acrylonitrile copolymers), HNBR (partially or completely hydrogenated NBR rubber), EPDM (ethylene-propylene-diene terpolymers) and mixtures of these rubbers. Natural rubber, E-SBR and S-SBR with a glass temperature above –60° C., polybutadiene rubber with a high cis content (>90%) produced with catalysts based on Ni, Co, Ti or Nd, polybutadiene rubber with a vinyl content of up to 80% and mixtures thereof are of particular interest for the manufacture of automotive tires.

All known fillers used in the rubber industry can be considered as fillers for the rubber compositions according to the invention. These include both active and inactive fillers.

Examples include but are not limited to:
highly disperse silicas, produced for example by precipitation of solutions of silicates or flame hydrolysis of silicon halides with specific surfaces of 5-1000, preferably 20-400 $m^2/g$ (BET surface) and with primary particle sizes of 10-400 nm. Silicas may also be present as mixed oxides with other metal oxides such as Al, Mg, Ca, Ba, Zn, Zr, Ti oxides;
synthetic silicates such as aluminum silicate, alkaline earth silicate such as magnesium silicate or calcium silicate, with BET surfaces of 20-400 $m^2/g$ and primary particle diameters of 10-400 nm;
natural silicates such as kaolin, montmorillonite and other naturally occurring silicas;
glass fibers and glass fiber products (mats, strands) or microspheres;
metal oxides such as zinc oxide, calcium oxide, magnesium oxide, aluminum oxide;

metal carbonates, such as magnesium carbonate, calcium carbonate, zinc carbonate;

metal hydroxides, such as aluminum hydroxide, magnesium hydroxide;

metal sulfates, such as calcium sulfate, barium sulfate;

carbon black: The carbon blacks to be used are carbon blacks produced by the flame soot, channel, furnace, gas soot, thermal, acetylene soot or arc process and have BET surfaces of 9-200 m2/g, for example SAF-, ISAF-LS-, ISAF-HM-, ISAF-LM-, ISAF-HS-, CF-, SCF-, HAF-LS-, HAF-, HAF-HS-, FF-HS-, SPF-, XCF-, FEF-LS-, FEF-, FEF-HS-, GPF-HS-, GPF-, APF-, SRF-LS-, SRF-LM-, SRF-HS-, SRF-HM- and MT- soot or according to ASTM N110-, N219-, N220-, N231-, N234-, N242-, N294-, N326-, N327-, N330-, N332-, N339-, N347-, N351-, N356, N358, N375, N472, N539, N550, N568, N650, N660, N754, N762, N765, N774, N787 and N990 carbon blacks;

rubber gels, in particular those based on BR, E-SBR and/or polychloroprene with particle sizes from 5 to 1000 nm.

Highly disperse silicas and/or carbon blacks are preferred as fillers.

These fillers can be used alone or in a mixture. In a particularly preferred form, the rubber compositions contain as fillers a mixture of light fillers, such as highly dispersed silicas, and carbon black, the mixing ratio of light fillers to carbon black being from 0.01:1 to 50:1, preferably from 0.05:1 to 20:1 parts by weight.

The fillers are used in quantities ranging from 10 to 500 parts by weight based on 100 parts by weight rubber. Quantities in the range of 20 to 200 parts by weight are preferred.

In a further embodiment of the invention, the rubber compositions also contain rubber auxiliaries which, for example, improve the processing properties of the rubber compositions, serve to crosslink the rubber compositions, improve the physical properties of the vulcanizates produced from the rubber compositions corresponding to the invention for their special purpose, improve the interaction between rubber and filler or serve to bond the rubber to the filler.

Rubber auxiliaries include crosslinking agents such as sulfur or sulfur-supplying compounds, as well as reaction accelerators, antioxidants, heat stabilizers, light stabilizers, ozone stabilizers, processing aids, plasticizers, tackifiers, blowing agents, dyes, pigments, waxes, extenders, organic acids, silanes, retarders, metal oxides, extender oils such as DAE (Distillate Aromatic Extract)-, TDAE (Treated Distillate Aromatic Extract)-, MES (Mild Extraction Solvates)-, RAE (Residual Aromatic Extract)-, TRAE (Treated Residual Aromatic Extract)-, naphthenic and heavy naphthenic oils as well as activators.

The total amount of rubber additives ranges from 1 to 300 parts by weight, based on 100 parts by weight of total rubber. Preferably quantities in the range of 5 to 150 parts by weight of rubber auxiliaries are used.

The vulcanizable rubber compositions can be produced in a single-stage or a multi-stage process, with 2 to 3 mixing stages being preferred. For example, sulfur and accelerator can be added in a separate mixing stage on a roller, with temperatures in the range of 30° C. to 90° C. being preferred. Sulfur and accelerator are preferably added in the final mixing stage.

Aggregates suitable for the production of vulcanizable rubber compositions include rollers, kneaders, internal mixers or mixing extruders.

Another aspect of the invention relates to the use of an 1-amino-3-(oxyalkylalkoxysilyl)-2-propanol-terminated polymers with end groups of the formula (I) as described herein for the preparation of vulcanizable rubber compositions.

Another aspect of the invention relates to vulcanizable rubber compositions containing a) 1-amino-3-(oxyalkylalkoxysilyl)-2-propanol-terminated polymers with end groups of the formula (I) as described herein; optionally together with b) stabilizers, extender oils, fillers, rubbers and/or further rubber auxiliaries.

A further aspect of the invention relates to the use of the vulcanizable rubber compositions according to the invention for the production of rubber vulcanizates, in particular for the production of tires, in particular tire treads, which have a particularly low rolling resistance with high wet slip strength and abrasion resistance.

The vulcanizable rubber compositions in accordance with the invention are also suitable for the manufacture of molded articles, for example for the manufacture of cable sheaths, hoses, drive belts, conveyor belts, roll linings, shoe soles, sealing rings, or damping elements.

Another aspect of the invention relates to a molded article, in particular a tire, obtainable by the above use, i.e. prepared from a vulcanizable rubber composition according to the invention involving vulcanization.

The following examples serve to explain the invention without limiting its scope.

EXAMPLES

The number-average molecular weight Mn, the polydispersity Mw/Mn and the degree of coupling of the styrene-butadiene rubbers were determined using GPC (PS calibration).

The Mooney viscosity ML(1+4)100° C. was measured according to DIN 52523/52524.

The vinyl and styrene content was determined by FTIR spectroscopy on rubber films.

The glass transition temperature Tg was determined using DSC from the 2nd heating curve at a heating rate of 20 K/min.

The loss factors tan δ were measured at 0° C. and tan δ at 60° C. to determine the temperature-dependent dynamic-mechanical properties. An Eplexor device (Eplexor 500 N) from Gabo was used for this purpose. The measurements were carried out in accordance with DIN 53513 at 10 Hz on Ares strips in the temperature range from −100° C. to 100° C. The Eplexor 500 N was used for this purpose. To determine the strain-dependent dynamic-mechanical properties, ΔG' was determined as the difference between the shear modulus at 0.5% strain and the shear modulus at 15% strain as well as the maximum loss factor tan δmax. These measurements were determined according to DIN53513-1990 on an MTS elastomer test system on cylinder specimens (20×6 mm) with 2 mm compression at a temperature of 60° C. and a measuring frequency of 10 Hz in the strain range from 0.1% to 40%.

The rebound elasticity was determined at 23° C. and 60° C. according to DIN 53512.

Styrene-Butadiene Copolymers

Example 1: Synthesis of Styrene-Butadiene Copolymer, Non-Functionalized (Comparative Example)

An inert 20 L reactor was filled with 8.5 kg hexane, 6.6 mmol 2,2-bis(2-tetrahydrofuryl)-propane and 12.1 mmol n-butyllithium (as a 23% solution by weight in hexane) and the contents heated to 40° C. The heating circuit was then closed and 1185 g of 1,3-butadiene and 315 g of styrene were added simultaneously. It was polymerized under stirring for 35 minutes whereas the reactor contents reached a peak temperature of 61° C. 12.1 mmol n-octanol was then added to stop the anionic polymer chain ends. The rubber solution was drained, stabilized by adding 3 g Irganox® 1520 (2,4-bis(octylthiomethyl)-6-methylphenol) and the solvent removed by stripping with steam. The rubber crumbs were dried at 65° C. for 16 h in a vacuum drying oven.

The number-average molecular weight Mn, the molecular weight distribution Mw/Mn, the degree of coupling (all from the GPC measurement with PS calibration), the Mooney viscosity ML1+4@100° C., the vinyl and styrene content (from the FTIR measurement, data in % by weight, based on the total polymer), as well as the glass transition temperature Tg (from the DSC measurement) were determined on the dried rubber crumbs. The values are listed in Table 1.

Example 2: Functionalization of Styrene-Butadiene Copolymer by Reaction with 1,3-dimethyl-2-imidazolidinone (Comparative Example)

The procedure was the same as in example 1. Instead of n-octanol, however, the amount of the functionalization reagent 1,3-dimethyl-2-imidazoli¬dinone (1) equimolar to n-butyllithium was added and the reactor content then stirred for a further 5 minutes. The rubber solution was then drained, stabilized by adding 3 g Irganox® 1520 (2,4-bis (octylthiomethyl)-6-methylphenol) and the solvent removed by stripping with steam. The rubber crumbs were dried at 65° C. for 16 h in a vacuum drying oven.

Example 3: Functionalization of Styrene-Butadiene Copolymer by Reaction with (3-glycidoxypropyl)trimethoxysilane (Comparative Example)

The procedure was the same as in example 2. As functionalization reagent, the amount of (3-glycidoxypropyl)trimethoxysilane (15) equimolar to n-butyl-lithium was added.

Example 4: Functionalization of Styrene-Butadiene Copolymer by Reaction with (3-glycidoxypropyl)triethoxysilane (Comparative Example)

The procedure was the same as in example 2. As functionalization reagent, the amount of (3-glycidoxypropyl)triethoxysilane (16) equimolar to n-butyl-lithium was added.

Example 5: Functionalization of Styrene-Butadiene Copolymer by Successive Reaction with 1,3-dimethyl-2-imidazolidinone and (3-glycidoxypropyl)trimethoxysilane (Inventive Example)

The procedure was the same as in example 2. For functionalization, the amount of 1,3-dimethyl-2-imidazolidinone (1) equimolar to n-butyl-lithium was added first. It was stirred for 5 minutes and then the amount of (3-glycidoxypropyl)trimethoxysilane (15) equimolar to n-butyllithium was added.

Example 6: Functionalization of Styrene-Butadiene Copolymer by Successive Reaction with 1,3-dimethyl-2-imidazolidinone and (3-glycidoxypropyl)triethoxysilane (Inventive Example)

The procedure was the same as in example 2. For functionalization, the amount of 1,3-dimethyl-2-imidazolidinone (1) equimolar to n-butyl-lithium was added first. It was stirred for 5 minutes and then the amount of 3-glycidoxypropyltriethoxysilane (16) equimolar to n-butyllithium was added.

The polymer properties of styrene-butadiene copolymers from examples 1-6 are summarized in Table 1. Table 1 shows that the 1-amino-3-(oxyalkylalkoxysilyl)-2-propanol-terminated polymers of examples 5 and 6, prepared by successive addition of the two functionalization reagents according to formula (II) and (III), have significantly reduced degrees of coupling compared to the polymers of examples 3 and 4, prepared by addition of functionalization reagents according to formula (III) without prior addition of a functionalization reagent according to formula (II).

Rubber Compounds

Tire tread rubber compounds containing the styrene-butadiene copolymers of examples 1-6 were produced. The components are listed in Table 2. The components (without sulfur and accelerator) were mixed in a 1.5 L kneader. The components sulfur and accelerator were mixed in on a roller at 40° C. The individual steps in the preparation of the mixture are listed in Table 3.

TABLE 1

Properties of the styrene-butadiene copolymers according to Examples 1-6

| S-SBR from Example | functionalization reagent according to formula (II) | functionalization reagent according to formula (III) | $M_n$ [kg/mol] | $M_w/M_n$ | degree of coupling [%] | ML1 + 4 [ME] | Vinyl-content [wt.-%] | Styrene-content [wt.-%] | Tg [° C.] |
|---|---|---|---|---|---|---|---|---|---|
| 1 (comparativ) | — | — | 269 | 1.12 | 0 | 45 | 49.2 | 20.7 | −26.8 |
| 2 (comparativ) | (1) | — | 207 | 1.40 | 2 | 51 | 49.6 | 20.5 | −27.2 |
| 3 (comparativ) | — | (15) | 308 | 1.38 | 33 | 67 | 50.4 | 20.2 | −26.1 |
| 4 (comparativ) | — | (16) | 292 | 1.50 | 29 | 64 | 49.9 | 20.6 | −26.3 |
| 5 (inventive) | (1) | (15) | 248 | 1.41 | 6 | 74 | 51.8 | 20.2 | −24.3 |
| 6 (inventive) | (1) | (16) | 239 | 1.47 | 7 | 67 | 48.6 | 20.8 | −27.1 |

TABLE 2

Components of tire tread rubber compounds
(Specifications in phr: parts by weight per 100 parts by weight rubber)

| Component | phr |
|---|---|
| Styrene-butadiene copolymer | 70 |
| High-cis polybutadiene (BUNA CB 24 from Arlanxeo Deutschland GmbH) | 30 |
| Silica (Ultrasil ® 7000) | 90 |
| Carbon black (Vulcan ® J/N 375) | 7 |
| TDAE oil (Vivatec 500) | 36.3 |
| Processing aid (Aflux 37) | 3 |
| Stearic acid (Edenor C 18 98-100) | 1 |
| Antioxidant (Vulkanox ® 4020/LG der Lanxess Deutschland GmbH) | 2 |
| Antioxidant (Vulkanox ® HS/LG der Lanxess Deutschland GmbH) | 2 |
| Zink oxide (Zinkweiβ Rotsiegel) | 3 |
| Light protection wax (Antilux 654) | 2 |
| Silane (Si 69 ® from Evonik) | 7.2 |
| Diphenylguanidine (Rhenogran DPG-80) | 2.75 |
| Sulfenamide (Vulkacit ® NZ/EGC from Lanxess Deutschland GmbH) | 1.6 |
| Sulphur (Mahlschwefel 90/95 Chancel) | 1.6 |
| Sulfonamide (Vulkalent ® E/C) | 0.2 |

TABLE 3

Preparation

| | | |
|---|---|---|
| Step 1: Mixing in a 1.5 litre kneader | 0 seconds | Addition of polymers |
| | 30 seconds | Addition of ⅔ silica, ⅔ silane, stearic acid, wax, antioxidant, carbon black |
| | 90 seconds | Addition of residual silica and silane |
| | 150 seconds | Addition of zinc oxide |
| | 240 seconds | Heat up to 150° C., hold at temperature for 3 min |
| | 420 seconds | Ejection |
| Step 2: Mixing on the roller | | Cut the sheet three times left and right followed by 3 revolutions at 40° C. and a nip of 4 mm |
| Step 3: | | 24 hours storage at 24° C. |
| Step 4: Mixing in a 1.5 litre kneader | 0 seconds | Addition of the compound from step 3 |
| | 30 seconds | Heat up to 150° C., hold at temperature for 3 min |
| | 210 seconds | Ejection |
| Step 5: Mixing on the roller | | Addition of sulphur and accelerator, cut the sheet three times left and right followed by 3 rounds at 40° C. and a nip of 4 mm |

The rubber compounds were vulcanized at 160° C. for 20 minutes. The physical properties of the corresponding vulcanizates 7-12 are listed in Table 4. The vulcanizate properties of the vulcanized rubber compound from comparison example 7 with the non-functionalized styrene-butadiene copolymer as the compound component are given an index of 100. All values greater than 100 in Table 4 indicate a corresponding percentage improvement of the respective test property.

TABLE 4 properties of vulcanizates

| | vulcanizate Example 7 | vulcanizate Example 8 | vulcanizate Example 9 | vulcanizate Example 10 | vulcanizate Example 11 | vulcanizate Example 12 |
|---|---|---|---|---|---|---|
| contains SBR from Example | 1 | 2 | 3 | 4 | 5 | 6 |
| Tanδ at 0° C. | 100 | 115 | 114 | 110 | 115 | 111 |
| Tanδ at 60° C. | 100 | 114 | 116 | 117 | 118 | 121 |
| Tanδ Maximum | 100 | 111 | 108 | 114 | 115 | 118 |
| ΔG' | 100 | 145 | 131 | 155 | 162 | 165 |
| rebound elasticity at 23° C. | 100 | 92 | 91 | 92 | 100 | 96 |
| rebound elasticity at 60° C. | 100 | 112 | 110 | 111 | 113 | 112 |

The rebound elasticity at 60° C., the loss factor tan δ at 60° C. from the temperature-dependent dynamic-mechanical measurement as well as the tan δ maximum and the modulus difference G' between low and high strain from the strain-dependent dynamic-mechanical measurement are indicators for the rolling resistance in the tire. The loss factor tan δ at 0° C. and the rebound elasticity at 23° C. are indicators for the wet slip resistance of the tire.

As can be seen from Table 4, all vulcanizates containing functionalized diene rubbers are characterized by improved values for the wet grip indicator tan δ at 0° C. and the rolling resistance indicators. The vulcanizates from the inventive examples 11 and 12 show the best overall picture of all property indicators.

The invention claimed is:

1. An 1-amino-3-(oxyalkylalkoxysilyl)-2-propanol-terminated polymer according to general formula (I),

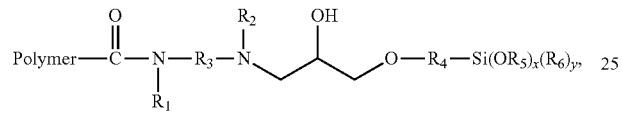

(I)

wherein
the polymer contains at least one carbon-carbon double bond;
$R_1$ is selected from the group consisting of
  (i) a —$C_1$-$C_{24}$-alkyl that is saturated or unsaturated and that is unsubstituted, mono- or polysubstituted;
  (ii) a —$C_1$-$C_{24}$-heteroalkyl that is saturated or unsaturated and that is unsubstituted, mono- or polysubstituted;
  (iii) a 6-24-membered aryl that is unsubstituted, mono- or polysubstituted;
  (iv) a 5-24-membered heteroaryl that is unsubstituted, mono- or polysubstituted;
  (v) a 3-24-membered cycloalkyl that is saturated or unsaturated and that is unsubstituted, mono- or polysubstituted; and
  (vi) a 3-24-membered heterocycloalkyl that is saturated or unsaturated and is unsubstituted, mono- or polysubstituted;
$R_2$ is selected from the group consisting of
  (i) a —$C_1$-$C_{24}$-alkyl, which is saturated or unsaturated, and which is unsubstituted, mono- or polysubstituted;
  (ii) a —$C_1$-$C_{24}$-heteroalkyl, which is saturated or unsaturated, and which is unsubstituted, mono- or polysubstituted;
  (iii) a 6-24-membered aryl, which is unsubstituted, mono- or polysubstituted;
  (iv) a 5-24-membered heteroaryl, which is unsubstituted, mono- or polysubstituted;
  (v) a 3-24-membered cycloalkyl, which is saturated or unsaturated, and which is unsubstituted, mono- or polysubstituted; and
  (vi) a 3-24-membered heterocycloalkyl, which is saturated or unsaturated, and which is unsubstituted, mono- or polysubstituted;
$R_3$ is selected from the group consisting of
  (i) a —$C_1$-$C_6$-alkylene- that is saturated or unsaturated and that is unsubstituted, mono- or polysubstituted;
  (ii) a —$C_1$-$C_6$-heteroalkylene- that is saturated or unsaturated and that is unsubstituted, mono- or polysubstituted; and
  (iii) a 6-14-membered arylene that is unsubstituted, mono- or polysubstituted;
$R_4$ is selected from the group consisting of
  (i) a-$C_1$-$C_6$-alkylene- that is saturated or unsaturated and that is unsubstituted, mono- or polysubstituted;
  (ii) a-$C_1$-$C_6$-heteroalkylene- that is saturated or unsaturated and that is unsubstituted, mono- or polysubstituted; and
  (iii) a 6-14-membered arylene that is unsubstituted, mono- or polysubstituted;
$R_5$ is selected from the group consisting of
  (i) a —$C_1$-$C_6$-alkyl that is saturated or unsaturated and that is unsubstituted, mono- or polysubstituted;
  (ii) a —$C_1$-$C_6$-heteroalkyl that is saturated or unsaturated and that is unsubstituted, mono- or polysubstituted; and
  (iii) a 6-14-membered aryl that is unsubstituted, mono- or polysubstituted;
$R_6$ is selected from the group consisting of
  (i) a —$C_1$-$C_6$-alkyl that is saturated or unsaturated and that is unsubstituted, mono- or polysubstituted;
  (ii) a —$C_1$-$C_6$-heteroalkyl that is saturated or unsaturated and that is unsubstituted, mono- or polysubstituted; and
  (iii) a 6-14-membered aryl that is unsubstituted, mono- or polysubstituted;
wherein "mono- or polysubstituted" means substituted with one substituent in the case of "monosubstituted" or with more than one substituent in the case of "polysubstituted", wherein the substituents independently of one another are selected from the group consisting of —F, —Cl, —Br, —I, —CN, =O, —$CF_3$, —$CF_2H$, —$CFH_2$, —$CF_2Cl$, —$CFCl_2$, —$C_1$-$C_{18}$-alkyl that is saturated or unsaturated, and —$C_1$-$C_{18}$-heteroalkyl that is saturated or unsaturated;
and
x+y=3 with 1≤x≤3 and 0≤y≤2.

2. The 1-amino-3-(oxyalkylalkoxysilyl)-2-propanol-terminated polymer according to claim 1, wherein the polymer is a homopolymer or a copolymer of one or more conjugated dienes.

3. The 1-amino-3-(oxyalkylalkoxysilyl)-2-propanol-terminated polymer according to claim 1, wherein the polymer is obtained by copolymerization of 1,3-butadiene with styrene; or isoprene with styrene.

4. The 1-amino-3-(oxyalkylalkoxysilyl)-2-propanol-terminated polymer according to claim 1, wherein
$R_1$ is (i) —$C_1$-$C_6$-alkyl, which is saturated or unsaturated, and which is unsubstituted;
$R_2$ is (i) —$C_1$-$C_6$-alkyl, which is saturated or unsaturated, and which is unsubstituted;
$R_3$ is (i) —$C_1$-$C_6$-alkylene-, which is saturated or unsaturated, and which is unsubstituted;
$R_4$ is —$C_1$-$C_6$-alkylene-, which is saturated or unsaturated, and which is unsubstituted; and
$R_5$ is —$C_1$-$C_6$-alkyl, which is saturated or unsaturated, and which is unsubstituted and $R_6$ is —$C_1$-$C_6$-alkyl, which is saturated or unsaturated, and which is unsubstituted; x is 3 and y is 0.

5. The 1-amino-3-(oxyalkylalkoxysilyl)-2-propanol-terminated polymer according to claim 1, wherein
the polymer is obtained by copolymerization of 1,3-butadiene with styrene;

$R_1$ is —$C_1$-$C_2$-alkyl, which is saturated or unsaturated, and which is unsubstituted;

$R_2$ is —$C_1$-$C_2$-alkyl, which is saturated or unsaturated, and which is unsubstituted;

$R_3$ is —$C_1$-$C_2$-alkylene-, which is saturated or unsaturated, and which is unsubstituted;

$R_4$ is —$C_3$-alkylene-, which is saturated or unsaturated, and which is unsubstituted;

$R_5$ and $R_6$ independently of one another are —$C_1$-$C_2$-alkyl, which is saturated or unsaturated, and which is unsubstituted; and $x+y=3$ with $1 \leq x \leq 3$ and $0 \leq y \leq 2$.

6. A method for manufacturing a 1-amino-3-(oxyalkylalkoxysilyl)-2-propanol-terminated polymer according to general formula (I),

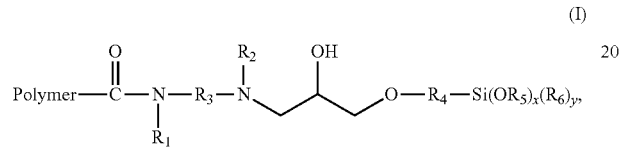

comprising the following steps:
(a) providing a polymer intermediate containing at least one carbon-carbon double bond prepared by anionic diene polymerization or diene polymerization using a coordination catalyst;
(b) providing a cyclic urea derivative of the general formula (II)

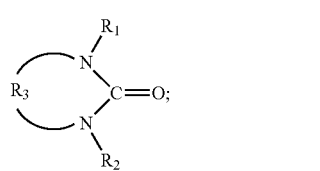

(c) providing a glycidoxyalkylsilane of the general formula (III)

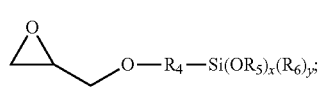

(d) adding the cyclic urea derivative of the general formula (II) to the polymer as a first functionalization reagent to form a functionalized polymer intermediate; and
(e) subsequently adding the glycidoxyalkylsilane of the general formula (III) to the functionalized polymer intermediate as a second functionalization reagent to form the 1-amino-3-(oxyalkylalkoxysilyl)-2-propanol-terminated polymer according to general formula (I);

wherein
$R_1$ is selected from the group consisting of
(i) a —$C_1$-$C_{24}$-alkyl that is saturated or unsaturated and that is unsubstituted, mono- or polysubstituted;
(ii) a —$C_1$-$C_{24}$-heteroalkyl that is saturated or unsaturated and that is unsubstituted, mono- or polysubstituted;
(iii) a 6-24-membered aryl that is unsubstituted, mono- or polysubstituted;
(iv) a 5-24-membered heteroaryl that is unsubstituted, mono- or polysubstituted;
(v) a 3-24-membered cycloalkyl that is saturated or unsaturated and that is unsubstituted, mono- or polysubstituted; and
(vi) a 3-24-membered heterocycloalkyl that is saturated or unsaturated and is unsubstituted, mono- or polysubstituted;

$R_2$ is selected from the group consisting of
(i) a —$C_1$-$C_{24}$-alkyl, which is saturated or unsaturated, and which is unsubstituted, mono- or polysubstituted;
(ii) a —$C_1$-$C_{24}$-heteroalkyl, which is saturated or unsaturated, and which is unsubstituted, mono- or polysubstituted;
(iii) a 6-24-membered aryl, which is unsubstituted, mono- or polysubstituted;
(iv) a 5-24-membered heteroaryl, which is unsubstituted, mono- or polysubstituted;
(v) a 3-24-membered cycloalkyl, which is saturated or unsaturated, and which is unsubstituted, mono- or polysubstituted; and
(vi) a 3-24-membered heterocycloalkyl, which is saturated or unsaturated, and which is unsubstituted, mono- or polysubstituted;

$R_3$ is selected from the group consisting of
(i) a —$C_1$-$C_6$-alkylene- that is saturated or unsaturated and that is unsubstituted, mono- or polysubstituted;
(ii) a —$C_1$-$C_6$-heteroalkylene- that is saturated or unsaturated and that is unsubstituted, mono- or polysubstituted; and
(iii) a 6-14-membered arylene that is unsubstituted, mono- or polysubstituted;

$R_4$ is selected from the group consisting of
(i) a —$C_1$-$C_6$-alkylene- that is saturated or unsaturated and that is unsubstituted, mono- or polysubstituted;
(ii) a —$C_1$-$C_6$-heteroalkylene- that is saturated or unsaturated and that is unsubstituted, mono- or polysubstituted; and
(iii) a 6-14-membered arylene that is unsubstituted, mono- or polysubstituted;

$R_5$ is selected from the group consisting of
(i) a —$C_1$-$C_6$-alkyl that is saturated or unsaturated and that is unsubstituted, mono- or polysubstituted;
(ii) a —$C_1$-$C_6$-heteroalkyl that is saturated or unsaturated and that is unsubstituted, mono- or polysubstituted; and
(iii) a 6-14-membered aryl that is unsubstituted, mono- or polysubstituted;

$R_6$ is selected from the group consisting of
(i) a —$C_1$-$C_6$-alkyl that is saturated or unsaturated and that is unsubstituted, mono- or polysubstituted;
(ii) a -$C_1$-$C_6$-heteroalkyl that is saturated or unsaturated and that is unsubstituted, mono- or polysubstituted; and
(iii) a 6-14-membered aryl that is unsubstituted, mono- or polysubstituted;

wherein "mono- or polysubstituted" means substituted with one substituent in the case of "monosubstituted" or with more than one substituent in the case of "polysubstituted", wherein the substituents independently of one another are selected from the group consisting of —F, —Cl, —Br, —I, —CN, =O, —$CF_3$, —$CF_2H$, —$CFH_2$, —$CF_2Cl$, —$CFCl_2$, a —$C_1$-$C_{18}$- alkyl that is saturated or unsaturated, or a-$C_1$-$C_{18}$-heteroalkyl that is saturated or unsaturated; and x+y=3 with 1≤x≤3 and 0≤y≤2.

7. The method according to claim 6, wherein step (a) is performed by an anionic solution polymerization, or a polymerization using a coordination catalyst.

8. The method according to claim 6, wherein step (a) is performed in the presence of a solvent; and an initiator.

9. The method according to claim 6, which comprises at least one of additional (f) to (j):

(f) adding a coupling reagent before, together with or after addition of the cyclic urea derivative of the general formula (II);

(g) adding an antioxidant after the cyclic urea derivative of the general formula (II) and the glycidoxyalkylsilane of the general formula (III) have been added;

(h) adding an extender oil;

(i) adding a filler;

(j) adding a rubber or a rubber additive.

10. The 1-amino-3-(oxyalkylalkoxysilyl)-2-propanol-terminated polymer according to claim 1, wherein the polymer is a diene rubber.

11. The 1-amino-3-(oxyalkylalkoxysilyl)-2-propanol-terminated polymer according to claim 10, wherein the polymer is a homo- or copolymer of 1,3-butadiene, isoprene, 1,3-pentadiene, 2,3-dimethylbutadiene, 1-phenyl-1,3-butadiene, myrcene, farnesene, ocimene, or 1,3-hexadiene, or a combination thereof; or a copolymer of (i) 1,3-butadiene, isoprene, 1,3-pentadiene, 2,3-dimethylbutadiene, 1-phenyl-1,3-butadiene, 1,3-hexadiene, myrcene, farnesene, ocimene, or a combination thereof with (ii) styrene, o-, m- and/or p-methylstyrene, p-tert-butylstyrene, methylstyrene, vinylnaphthalene, divinylbenzene, trivinylbenzene, divinylnaphthalene, or a combination thereof.

12. The 1-amino-3-(oxyalkylalkoxysilyl)-2-propanol-terminated polymer according to claim 1, wherein the polymer is a copolymer of one or more conjugated dienes with one or more vinylaromatic monomers.

13. The method of claim 6, wherein the 1-amino-3-(oxyalkylalkoxysilyl)-2-propanol-terminated polymer is a diene rubber.

14. The method of claim 6, wherein the 1-amino-3-(oxyalkylalkoxysilyl)-2-propanol-terminated polymer is a homopolymer or a copolymer of one or more conjugated dienes.

15. The method of claim 6, wherein the 1-amino-3-(oxyalkylalkoxysilyl)-2-propanol-terminated polymer is a copolymer of one or more conjugated dienes with one or more vinylaromatic monomers.

16. The method of claim 6, wherein the polymer is a homo- or copolymer of 1,3-butadiene, isoprene, 1,3-pentadiene, 2,3-dimethylbutadiene, 1-phenyl-1,3-butadiene, myrcene, farnesene, ocimene, 1,3-hexadiene or a combination thereof; or a -copolymer of (i) 1,3-butadiene, isoprene, 1,3-pentadiene, 2,3-dimethylbutadiene, 1-phenyl-1,3-butadiene, 1,3-hexadiene, myrcene, farnesene, ocimene, or a combination thereof with (ii) styrene, o-, m- and/or p-methylstyrene, p-tert-butylstyrene, methylstyrene, vinylnaphthalene, divinylbenzene, trivinylbenzene, divinylnaphthalene, or a combination thereof.

17. The method of claim 6, wherein the polymer is a copolymer of 1,3-butadiene with styrene or isoprene with styrene.

18. The method of claim 6, wherein $R_1$ is (i) a —$C_1$-$C_6$-alkyl that is saturated or unsaturated and that is unsubstituted;

$R_2$ is a (i) a —$C_1$-$C_6$-alkyl that is saturated or unsaturated and that is unsubstituted;

$R_3$ is a (i) —$C_1$-$C_6$-alkylene- that is saturated or unsaturated and that is unsubstituted;

$R_4$ is a —$C_1$-$C_6$-alkylene- that is saturated or unsaturated and that is unsubstituted;

$R_5$ is a —$C_1$-$C_6$-alkyl that is saturated or unsaturated and that is unsubstituted; and $R_6$ is a —$C_1$-$C_6$-alkyl that is saturated or unsaturated and that is unsubstituted; and x is 3 and y is 0.

19. The method of claim 6, wherein the polymer is obtainable by copolymerization of 1,3-butadiene with styrene;

$R_1$ is a —$C_1$-$C_2$-alkyl that is saturated or unsaturated and that is unsubstituted;

$R_2$ is a —$C_1$-$C_2$-alkyl that is saturated or unsaturated and that is unsubstituted;

$R_3$ is a —$C_1$-$C_2$-alkylene- that is saturated or unsaturated and that is unsubstituted;

$R_4$ is a —$C_3$-alkylene- that is saturated or unsaturated and that is unsubstituted;

$R_5$ and $R_6$ are independently of one another a —$C_1$-$C_2$-alkyl that is saturated or unsaturated and that is unsubstituted; and x+y=3 with 1≤x≤3 and 0≤y≤2.

20. The method of claim 6, wherein wherein-step (a) is performed by a polymerization using a coordination catalyst, wherein the coordination catalyst is selected from a Ziegler-Natta catalyst or a monometallic catalyst system.

21. A molded article prepared from a vulcanizable composition comprising a polymer, wherein the preparation comprises vulcanization of the vulcanizable composition and wherein the polymer is an 1-amino-3-(oxyalkylalkoxysilyl)-2-propanol-terminated polymer according to general formula (I),

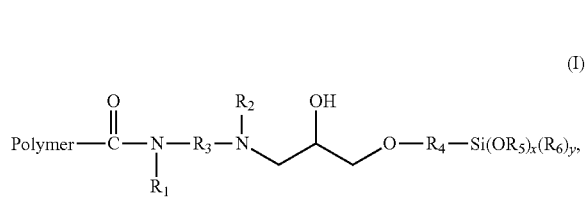

wherein the polymer contains at least one carbon-carbon double bond wherein $R_1$ is selected from the group consisting of (i) a —$C_1$-$C_{24}$-alkyl that is saturated or unsaturated and that is unsubstituted, mono- or polysubstituted;

(ii) a —$C_1$-$C_{24}$-heteroalkyl that is saturated or unsaturated and that is unsubstituted, mono- or polysubstituted;

(iii) a 6-24-membered aryl that is unsubstituted, mono- or polysubstituted;

(iv) a 5-24-membered heteroaryl that is unsubstituted, mono- or polysubstituted;

(v) a 3-24-membered cycloalkyl that is saturated or unsaturated and that is unsubstituted, mono- or polysubstituted; and
(vi) a 3-24-membered heterocycloalkyl that is saturated or unsaturated and is unsubstituted, mono- or polysubstituted;

$R_2$ is selected from the group consisting of
(i) a —$C_1$-$C_{24}$-alkyl, which is saturated or unsaturated, and which is unsubstituted, mono- or polysubstituted;
(ii) a —$C_1$-$C_{24}$-heteroalkyl, which is saturated or unsaturated, and which is unsubstituted, mono- or polysubstituted;
(iii) a 6-24-membered aryl, which is unsubstituted, mono- or polysubstituted;
(iv) a 5-24-membered heteroaryl, which is unsubstituted, mono- or polysubstituted;
(v) a 3-24-membered cycloalkyl, which is saturated or unsaturated, and which is unsubstituted, mono- or polysubstituted; and
(vi) a 3-24-membered heterocycloalkyl, which is saturated or unsaturated, and which is unsubstituted, mono- or polysubstituted;

$R_3$ is selected from the group consisting of
(i) a —$C_1$-$C_6$-alkylene- that is saturated or unsaturated and that is unsubstituted, mono- or polysubstituted;
(ii) a —$C_1$-$C_6$-heteroalkylene- that is saturated or unsaturated and that is unsubstituted, mono- or polysubstituted; and
(iii) a 6-14-membered arylene that is unsubstituted, mono- or polysubstituted;

$R_4$ is selected from the group consisting of
(i) a-$C_1$-$C_6$-alkylene- that is saturated or unsaturated and that is unsubstituted, mono- or polysubstituted;
(ii) a-$C_1$-$C_6$-heteroalkylene- that is saturated or unsaturated and that is unsubstituted, mono- or polysubstituted; and
(iii) a 6-14-membered arylene that is unsubstituted, mono- or polysubstituted;

$R_5$ is selected from the group consisting of
(i) a-$C_1$-$C_6$-alkyl that is saturated or unsaturated and that is unsubstituted, mono- or polysubstituted;
(ii) a-$C_1$-$C_6$-heteroalkyl that is saturated or unsaturated and that is unsubstituted, mono- or polysubstituted; and
(iii) a 6-14-membered aryl that is unsubstituted, mono- or polysubstituted;

$R_6$ is selected from the group consisting of
(i) a-$C_1$-$C_6$-alkyl that is saturated or unsaturated and that is unsubstituted, mono- or polysubstituted;
(ii) a-$C_1$-$C_6$-heteroalkyl that is saturated or unsaturated and that is unsubstituted, mono- or polysubstituted; and
(iii) a 6-14-membered aryl that is unsubstituted, mono- or polysubstituted;

wherein "mono- or polysubstituted" means substituted with one substituent in the case of "monosubstituted" or with more than one substituent in the case of "polysubstituted", wherein the substituents independently of one another are selected from the group consisting of —F, —Cl, —Br, —I, —CN, =O, —$CF_3$, —$CF_2H$, —$CFH_2$, —$CF_2Cl$, —$CFCl_2$, —$C_1$-$C_{18}$-alkyl that is saturated or unsaturated, or —$C_1$-$C_{18}$-heteroalkyl that is saturated or unsaturated; and x+y=3 with $1 \leq x \leq 3$ and $0 \leq y \leq 2$.

22. The molded article of claim 21, wherein the polymer is a homo- or copolymer of 1,3-butadiene, isoprene, 1,3-pentadiene, 2,3-dimethylbutadiene, 1-phenyl-1,3-butadiene, myrcene, farnesene, ocimene, 1,3-hexadiene or a combination thereof; or a copolymer of (i) 1,3-butadiene, isoprene, 1,3-pentadiene, 2,3-dimethylbutadiene, 1-phenyl-1,3-butadiene, 1,3-hexadiene, myrcene, farnesene, ocimene, or a combination thereof with (ii) styrene, o-, m- and/or p-methylstyrene, p-tert-butylstyrene, methylstyrene, vinylnaphthalene, divinylbenzene, trivinylbenzene, divinylnaphthalene, or a combination thereof.

23. The molded article of claim 21, wherein the polymer is a copolymer of 1,3-butadiene and styrene or a copolymer of isoprene and styrene.

24. The molded article of claim 21, wherein
$R_1$ is (i) a —$C_1$-$C_6$-alkyl that is saturated or unsaturated and that is unsubstituted
$R_2$ is a (i) a —$C_1$-$C_6$-alkyl that is saturated or unsaturated and that is unsubstituted
$R_3$ is a (i) —$C_1$-$C_6$-alkylene- that is saturated or unsaturated and that is unsubstituted
$R_4$ is a —$C_1$-$C_6$-alkylene- that is saturated or unsaturated and that is unsubstituted
$R_5$ is a —$C_1$-$C_6$-alkyl that is saturated or unsaturated and that is unsubstituted; and
$R_6$ is a —$C_1$-$C_6$-alkyl that is saturated or unsaturated and that is unsubstituted; and
x is 3 and y is 0.

25. The molded article of claim 21, wherein the polymer is a copolymer of 1,3-butadiene and styrene;
$R_1$ is a —$C_1$-$C_2$-alkyl that is saturated or unsaturated and that is unsubstituted;
$R_2$ is a —$C_1$-$C_2$-alkyl that is saturated or unsaturated and that is unsubstituted;
$R_3$ is a —$C_1$-$C_2$-alkylene- that is saturated or unsaturated and that is unsubstituted;
$R_4$ is a-$C_3$-alkylene- that is saturated or unsaturated and that is unsubstituted;
$R_5$ and $R_6$ are independently of one another a —$C_1$-$C_2$-alkyl that is saturated or unsaturated and that is unsubstituted; and
x+y=3 with $1 \leq x \leq 3$ and $0 \leq y \leq 2$.

26. The molded article of claim 21, which is selected from cable sheaths, hoses, drive belts, conveyor belts, roll linings, shoe soles, sealing rings, damping elements.

27. The molded article of claim 21, which is selected from a tire.

* * * * *